(12) United States Patent
Yanagisawa et al.

(10) Patent No.: US 8,004,145 B2
(45) Date of Patent: Aug. 23, 2011

(54) ELECTRIC ROTATING MACHINE

(75) Inventors: Yukiyoshi Yanagisawa, Hitachi (JP); Takeshi Kuwahara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 12/465,321

(22) Filed: May 13, 2009

(65) Prior Publication Data

US 2009/0289519 A1 Nov. 26, 2009

(30) Foreign Application Priority Data

May 20, 2008 (JP) ................................ 2008-131472

(51) Int. Cl.
*H02K 3/51* (2006.01)
(52) U.S. Cl. .......................................... 310/270; 310/71
(58) Field of Classification Search .................... 310/71, 310/214, 270
See application file for complete search history.

(56) References Cited

U.S. PATENT DOCUMENTS

| | | | | | |
|---|---|---|---|---|---|
| 630,930 | A | * | 8/1899 | Reist | 310/270 |
| 3,014,146 | A | * | 12/1961 | Andres | 310/270 |
| 3,745,395 | A | * | 7/1973 | Koechlin | 310/260 |
| 4,710,662 | A | * | 12/1987 | Balke et al. | 310/204 |
| 5,063,320 | A | * | 11/1991 | Watanabe et al. | 310/270 |
| 5,606,212 | A | * | 2/1997 | Sasa et al. | 310/270 |
| 6,020,670 | A | * | 2/2000 | Jones et al. | 310/270 |
| 7,432,628 | B2 | * | 10/2008 | Miyatake et al. | 310/270 |

FOREIGN PATENT DOCUMENTS

JP 3-178537 A 8/1991

* cited by examiner

*Primary Examiner* — Burton Mullins
(74) *Attorney, Agent, or Firm* — Mattingly & Malur, PC

(57) ABSTRACT

A lead conductor penetrating portion that bring out lead conductors to the inner diameter side is formed in a winding holding portion of a clamp ring for holding a rotor winding that overhangs from a rotor core, and furthermore a stopper is formed in a lead portion on the inner diameter side of the lead conductor, and a centrifugal force-resistant member for holding a centrifugal force acting on the lead conductor is interposed between the stopper and the inner diameter side of the winding holding portion.

12 Claims, 5 Drawing Sheets

ELECTRIC ROTATING MACHINE

BACKGROUND OF THE INVENTION

The present invention relates to an electric rotating machine, such as a generator motor, which is directly connected to a pump turbine used in a pumped storage power plant, and in particular relates to an electric rotating machine wherein a lead conductor is brought out from a rotor winding to deliver/receive electric power to/from a fixed side.

For example, in the electric rotating machine, such as a generator motor, a lead conductor of a rotor winding is brought out from an end of the rotor winding that overhangs from a rotor core, and is then led to an inner diameter, and is wired to a predetermined portion.

SUMMARY OF THE INVENTION

According to the structure of the conventional lead conductor described above, during operation of the electric rotating machine an excessive centrifugal force often acts on the lead conductor from the end of the rotor winding and displaces the whole lead conductor in the outer diameter direction. As a result, an insulation at the connecting portion between the lead conductor and the rotor winding is likely to be damaged or the connecting portion is likely to be broken.

It is thus an aim of the present invention to provide an electric rotating machine which has a sufficiently small displacement of the lead conductor from the end of the rotor winding even if exposed to an excessive centrifugal force, and which can maintain the stable connection of the lead conductor.

In order to achieve the above aim, according to an aspect of the present invention, a pressurizing portion that pressurizes a rotor core in the stacking direction and a winding holding portion for holding the rotor winding that overhangs on the outer circumferential side of the pressurizing portion from the rotor core are formed in a clamp ring, and in the winding holding portion of the clamp ring, a lead conductor penetrating portion to bring out the load conductor to the inner diameter side is formed, and furthermore a stopper is formed in a lead portion on the inner diameter side of the lead conductor, and a centrifugal force-resistant member for holding a centrifugal force acting on the lead conductor is interposed between this stopper and the inner diameter side of the winding holding portion.

In this way, by causing the lead conductor to extend through the winding holding portion of the clamp ring and also by providing a stopper on the inner diameter side of the lead conductor that was caused to extend therethrough, a centrifugal force-resistant member can be interposed between this stopper and the inner diameter side of the winding holding portion. As a result, the centrifugal force-resistant member can hold a centrifugal force that acts on the lead conductor, and therefore the displacement of the lead conductor can be reduced even if exposed to an excessive centrifugal force.

As described above, according to the present invention, an electric rotating machine can be obtained which has a small displacement of the lead conductor from the end of the rotor winding even if exposed to an excessive centrifugal force, and which can maintain the stable connection of the lead conductor.

Other objects, features and advantages of the invention will become apparent from the following description of the embodiments of the invention taken in conjunction with the accompanying drawings.

DESCRIPTION OF THE EMBODIMENTS

Hereinafter, a first embodiment of an electric rotating machine according to the present invention will be described based on a generator motor shown in FIG. 1 and FIG. 2.

Figure 1:
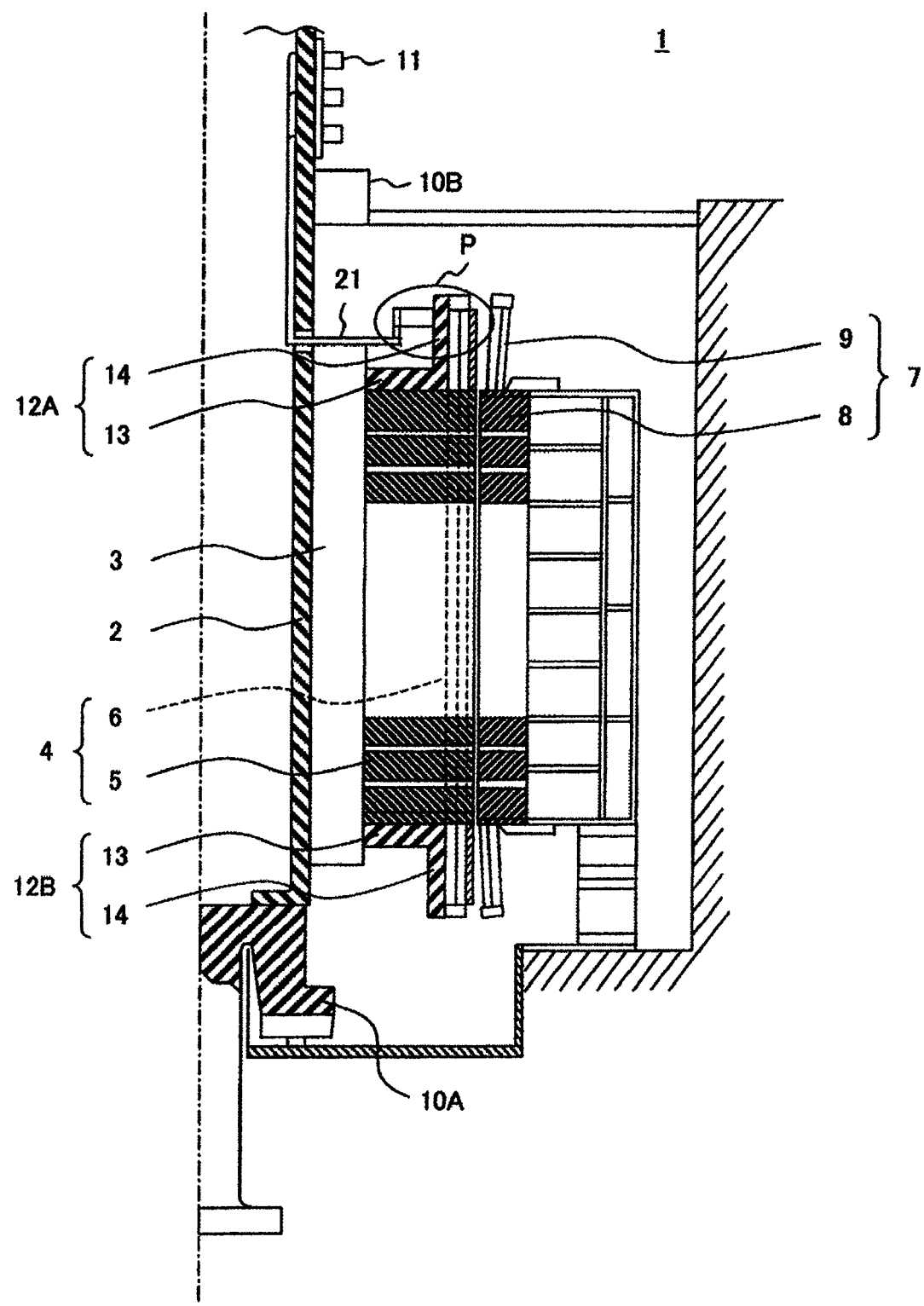
FIG. 1 is a vertical cross-sectional view showing the right half of a generator motor that is a first embodiment of an electric rotating machine according to the present invention.

As shown in FIG. 1, a generator motor 1 generally includes: a rotor 4 fixed to a rotary shaft 2 via a spider arm 3; a stator 7 that faces the rotor 4 via a gap in the diameter direction; a first bearing 10A and a second bearing 10B that rotatably support the rotary shaft 2; and a slip ring 11 provided in the vicinity of a top end of the rotary shaft 2. A pump turbine is connected to a rotating portion below the first bearing 10A, although the illustration is omitted.

The rotor 4 includes: a rotor core 5 stacked in the direction of the rotary shaft; and a rotor winding 6 incorporated in a plurality of winding grooves (not shown) that are long in the axis direction, the winding grooves being formed in the diameter direction on the outer circumferential side of the rotor core 5, wherein the rotor core 5 is pressurized in the stacking direction from both sides by clamp rings 12A, 12B.

In these clamp rings 12A, 12B, a disc-like pressurizing portion 13 for pressurizing the rotor core 5 in the stacking direction and a cylindrical winding-holding portion 14 for holding the rotor winding 6 that overhangs on the outer circumferential side of the pressurizing portion 13 from the rotor core 5 are formed extending on the opposite side of the rotor core, respectively.

On the outer circumferential surface side of the winding holding portion 14, a lower rotor winding 6D of the rotor winding 6 that overhangs from the rotor core 5 is placed via an insulation material 15 and further on top thereof an upper rotor winding 6U is placed via an insulation material 16. Then, these upper rotor winding 6U and lower rotor winding 6D overhanging from the rotor cores 5 are firmly bound with a binding wire 17 from the circumferential side of the upper rotor winding 6U.

Moreover, a recessed groove 18 is formed in an end portion on the opposite side of the rotor core of the winding holding portion 14. The recessed groove 18 serves as a lead conductor penetrating portion according to the present invention, through which a lead conductor 19 composed of a solid conductor is brought out to the inner diameter side.

The lead conductor 19, in this embodiment, is connected to the upper rotor winding 6U, and a stopper 20 is formed in the end portion brought out to the inner diameter side. Then, a lead conductor 21 is connected to the stopper 20, and the other end of the lead conductor 21 is connected to the slip ring 11.

Then, a cylinder 24 constituting a centrifugal force-resistant member via an insulation seat 22 and washer 23 is interposed between the inner circumferential surface of the winding holding portion 14 and the stopper 20. The cylinder 24 is formed so as to surround the lead conductor 19. Furthermore, the cylinder 24 is formed of semi-cylinders, which are divided along the longitudinal direction of the lead conductor taking into account the detachability, and the divided semi-cylinders sandwich and surround the lead conductor 19.

In such a configuration, although a centrifugal force acts on the lead conductor 19 during operation (during rotation) of the generator motor 1, the displacement in the outer diameter direction will almost disappear because the lead conductor 19 is held on the inner circumferential surface of the winding holding portion 14 by means of the cylinder 24.

As a result, an excessive stress will not act on the connecting portion between the lead conductor 19 and the upper rotor winding 6U and a stable connecting condition can be held, and it is therefore possible to avoid the damage of the insulation at the connecting portion between the lead conductor 19 and the upper rotor winding 6U or the breakage of the connection portion.

Incidentally, in the above-described embodiment, an insulation seat 23 is required because the cylinder 24 is formed of a reinforcement member, such as metal, however, by insulating the cylinder 24 itself or by forming the cylinder 24 of an insulative reinforcement member, it is possible to omit the insulation seat 23 and reduce the number of components. Other than this, by sufficiently performing the above insulation and also sufficiently taking a spatial distance between the conductive object, such as the cylinder 24, and the lead conductor 19, it is also possible to omit the insulation process of the lead conductor 19 and secure an insulation distance.

Moreover, although an example of bringing out the lead conductor 19 from the recessed groove 18 has been described in this embodiment, the lead conductor penetrating portion needs not necessarily to be a recessed groove and may be a through-hole 18H (shown in FIG. 2) that radially extends through a lead conductor 19A.

Figure 2:
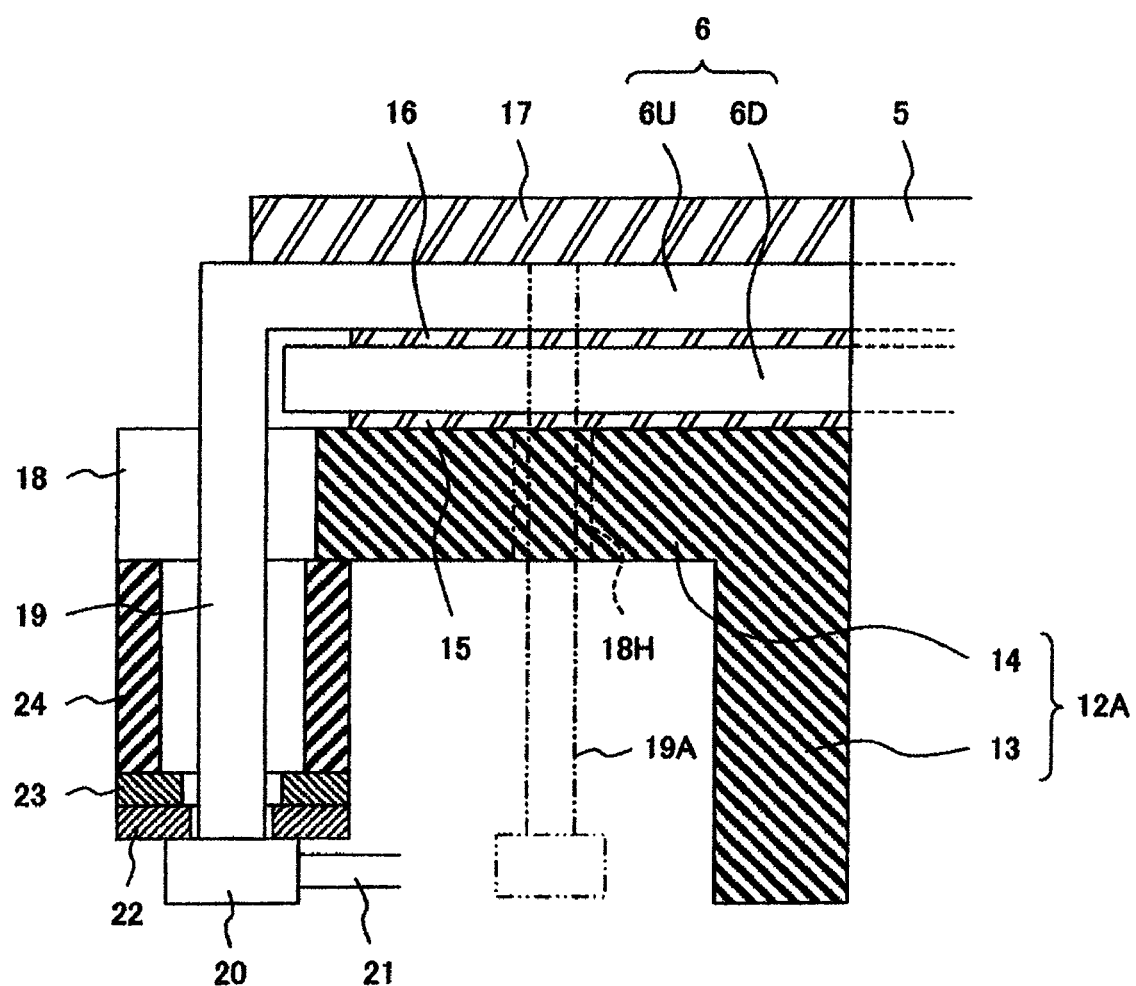
FIG. 2 is an enlarged view of a portion P of FIG. 1.
Figure 3:
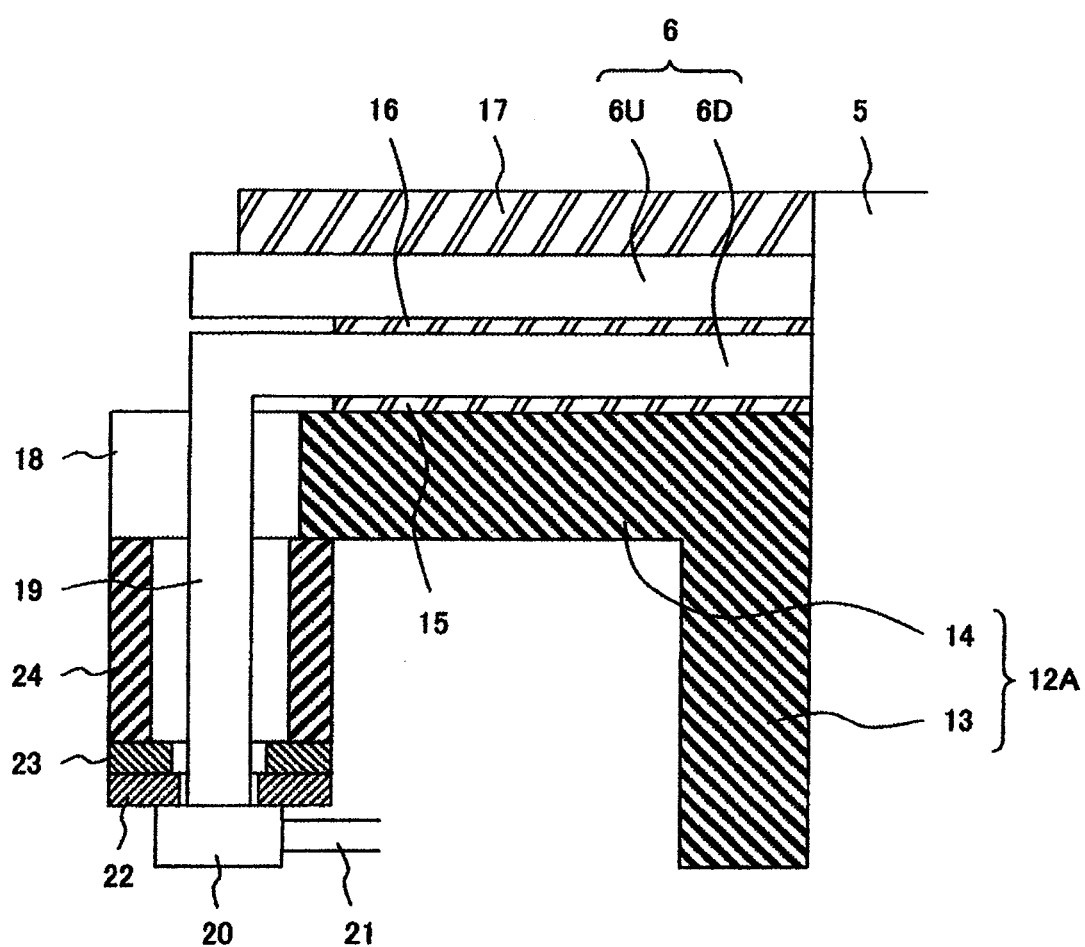
FIG. 3 is an enlarged view showing a modification example of the P portion of FIG. 1.

FIG. 3 shows a modification example of the first embodiment, and here the duplicated detailed description will be omitted since the same reference numeral as that of FIG. 2 represents an identical component member.

In this modification example, a configuration different from that of the first embodiment lies in that the lead conductor 19 is connected to the lower rotor winding 6D. Accordingly, also in this modification example, the same effect as that of the first embodiment can be obtained and a part of the configuration can be modified as in the first embodiment.

Figure 4:
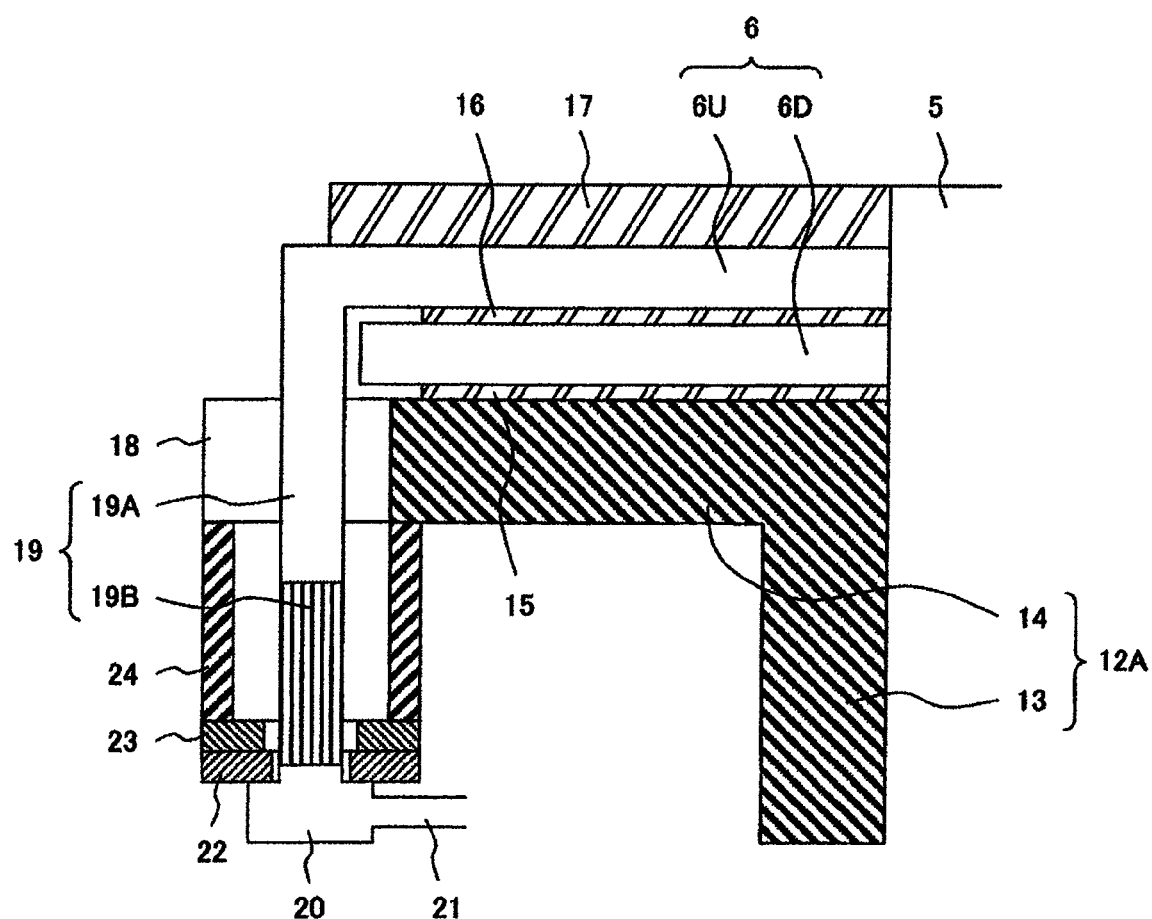
FIG. 4 is a view showing a second embodiment of the electric rotating machine according to the present invention.

FIG. 4 shows a second embodiment of the electric rotating machine according to the present invention. The duplicated detailed description will be omitted since the same reference numeral as that of FIG. 1 to FIG. 3 represents an identical component member.

In the second embodiment, a configuration different from the first embodiment lies in that the lead conductor 19 composed of a solid lead conductor 19A and a flexible lead conductors 19B.

Specifically, the side connected to the upper rotor winding 6U is the solid lead conductor 19A, and the side connected to the stopper 20 is the flexible lead conductor 19B having a plurality of thin steel sheets stacked, for example.

By connecting the flexible lead conductor 19B to a part of the lead conductor 19 in this manner, the flexible lead conductor 19B can, when the rotor winding 6 generates heat and elongates during operation of the generator motor, deform and absorb the elongation, and therefore an excessive stress will not act on the connecting portion between the lead conductor 19 and the upper rotor winding 6U. As a result, the lead conductor 19 and the upper rotor winding 6U can maintains a stable connecting condition, and it is therefore possible to avoid the damage of the insulation at the connecting portion between the lead conductor 19 and the upper rotor winding 6U or the breakage of the connecting portion. If the lead conductor 19 is firmly held with the cylinder 24 without using the flexible lead conductor 19B, it is impossible to absorb the heat elongation of the rotor winding 6, and an excessive stress will act on the connecting portion between the lead conductor 19 and the upper rotor winding 6U, resulting in a serious damage to the connecting portion.

Figure 5:
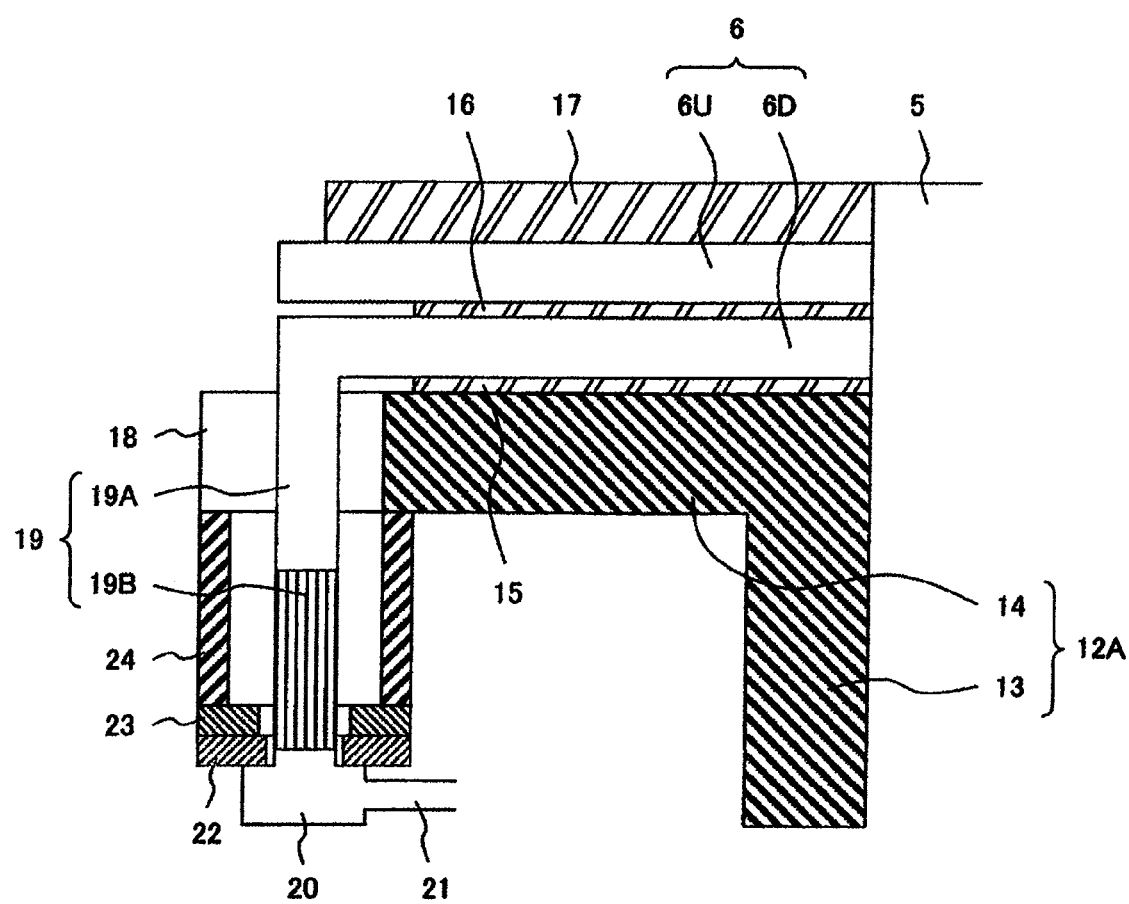
FIG. 5 is a view showing a modification example of the second embodiment.

FIG. 5 shows a modification example of the second embodiment, and here the duplicated detailed description is omitted since the same reference numeral as that of FIG. 4 represents an identical component member.

In this modification, a configuration different from that of the second embodiment lies in that the lead conductor 19 is connected to the lower rotor winding 6D. Accordingly, also in this modification example, the same effect as that of the second embodiment can be obtained and a part of the configuration can be modified as in the second embodiment.

As described above, according to the embodiment and the modification examples, the deformation of the lead conductor due to a centrifugal force can be prevented and the connection with the rotor winding can be stabilized.

Incidentally, in the foregoing, a generator motor as the electric rotating machine has been described as an example, but not specifically limited to the generator motor, and the present invention can be applied to any electric rotating machine if it has a configuration to bring out the lead conductor from the rotor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electric rotating machine, comprising:
a stator having a stator core and a stator winding; and
a rotor, the rotor comprising:
a rotor core that faces the stator core via a gap in a radial direction and is fixed to a rotary shaft;
a rotor winding incorporated in the rotor core;
a clamp ring having formed therein a pressurizing portion that pressurizes the rotor core in a stacking direction and a winding holding portion for holding a rotor winding that overhangs from the rotor core on a circumferential side of the pressurizing portion; and
a lead conductor that is brought out to an inner diameter side from the rotor winding overhanging from the rotor core, wherein
the lead conductor is brought out to the inner diameter side through the winding holding portion, and
a centrifugal force holding mechanism for holding a centrifugal force acting on the lead conductor is provided between the lead conductor and the winding holding portion.

2. An electric rotating machine comprising:
a stator having a stator core and a stator winding; and
a rotor, the rotor comprising:
a rotor core that faces the stator core via a gap in a radial direction and is fixed to a rotary shaft;
a rotor winding incorporated in the rotor core;
a clamp ring having formed therein a pressurizing portion that pressurizes the rotor core in a stacking direction and a winding holding portion for holding the rotor winding that overhangs from the rotor core on a circumferential side of the pressurizing portion; and
a lead conductor that is brought out to an inner diameter side from the rotor winding overhanging from the rotor core, wherein a lead conductor penetrating portion to bring out the lead conductor to the inner diameter side is formed in the winding holding portion, a stopper is formed in a lead portion on the inner diameter side of the lead conductor, and a centrifugal force-resistant member for holding a centrifugal force acting on the lead conductor is interposed between the stopper and the inner diameter side of the winding holding portion.

3. The electric rotating machine according to claim 2, wherein the centrifugal force-resistant member is formed so as to surround the lead conductor.

4. The electric rotating machine according to claim 2, wherein the lead conductor penetrating portion is a through-hole formed in the winding holding portion.

5. The electric rotating machine according to claim 2, wherein the lead conductor penetrating portion is a recessed groove having an opening on an opposite side of the rotor core in the winding holding portion.

6. The electric rotating machine according to claim 2, wherein the centrifugal force-resistant member is in contact with the stopper via an insulation material.

7. The electric rotating machine according to claim 6, wherein the centrifugal force-resistant member is a cylinder, and this cylinder is divided along a longitudinal direction of the lead conductor.

8. The electric rotating machine according to claim 2, wherein the centrifugal force-resistant member is insulated.

9. The electric rotating machine according to claim 2, wherein the lead conductor is formed of a solid conductor.

10. The electric rotating machine according to claim 2, wherein the lead conductor is partially formed of a flexible conductor.

11. The electric rotating machine according to claim 2, wherein the lead conductor secures an insulation distance by keeping a spatial distance from a neighboring conductive object.

12. An electric rotating machine, comprising:

a stator having a stator core and a stator winding; and a rotor, the rotor comprising:

a rotor core that faces the stator core via a gap in a radial direction and is fixed to a rotary shaft;

a rotor winding incorporated in the rotor core;

a clamp ring having formed therein a pressurizing portion that pressurizes the rotor core in a stacking direction and a winding holding portion for holding a rotor winding that overhangs from the rotor core on a circumferential side of the pressurizing portion; and a lead conductor that is brought out to an inner diameter side from the rotor winding overhanging from the rotor core, wherein the lead conductor is brought out to the inner diameter side from a portion positioned between an end portion of the rotor winding overhanging from the rotor core and a pressurizing portion of the clamp ring, a lead conductor penetrating portion to bring out the lead conductor to the inner diameter side is formed in the winding holding portion, a stopper is formed in a lead portion on the inner diameter side of the lead conductor, and a centrifugal force-resistant member for holding a centrifugal force acting on the lead conductor is interposed between the stopper and the inner diameter side of the winding holding portion.

* * * * *